(12) United States Patent  
Kaufner

(10) Patent No.: US 10,078,094 B2  
(45) Date of Patent: Sep. 18, 2018

(54) SENSOR SYSTEM FOR ROTATIONAL SPEED MEASUREMENT HAVING A POLE WHEEL WITH A LINEARIZED MAGNETIC FIELD

(71) Applicant: Schaeffler Technologies AG & Co. KG, Herzogenaurach (DE)

(72) Inventor: Benjamin Kaufner, Stegaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/026,843

(22) PCT Filed: Aug. 20, 2014

(86) PCT No.: PCT/DE2014/200413  
§ 371 (c)(1),  
(2) Date: Apr. 1, 2016

(87) PCT Pub. No.: WO2015/062592  
PCT Pub. Date: May 7, 2015

(65) Prior Publication Data  
US 2016/0231347 A1      Aug. 11, 2016

(30) Foreign Application Priority Data  
Oct. 29, 2013  (DE) ........................ 10 2013 221 943

(51) Int. Cl.  
*G01P 3/487* (2006.01)  
*G01D 5/244* (2006.01)  
(Continued)

(52) U.S. Cl.  
CPC .............. *G01P 3/487* (2013.01); *G01D 5/145* (2013.01); *G01D 5/2451* (2013.01); *G01D 5/24438* (2013.01)

(58) Field of Classification Search  
CPC ...... G01P 3/42; G01P 3/44; G01P 3/48; G01P 3/481; G01P 3/487; G01D 5/12–5/2525  
See application file for complete search history.

(56) References Cited

U.S. PATENT DOCUMENTS 3,317,829 A     5/1967  Kuhrt et al.  
5,164,668 A *  11/1992  Alfors .................. G01B 7/30  
                                                        324/207.12

(Continued)

FOREIGN PATENT DOCUMENTS

CH           386123        12/1964  
DE      102 10 372         9/2003  
(Continued)

*Primary Examiner* — Huy Q Phan  
*Assistant Examiner* — David Frederiksen  
(74) *Attorney, Agent, or Firm* — Davidson, Davidson & Kappel, LLC

(57) ABSTRACT

A sensor system (01) for measuring the rotational speed of a rotatable component having a pole wheel (02) comprising a carrier (04) with at least one path of alternating magnetic north and south poles (05), and at least one magnetic field sensor (03) for sampling the path of the pole wheel (02) is provided. The sensor system (01) provides that the rotational direction in front of and behind the magnetic field sensor (03) a ferromagnetic flux-conducting component (07) is arranged in each case opposite the path, the ferromagnetic flux-conducting components (07) being arranged in the installation space between the magnetic field sensor (03) and the pole wheel (02), the distance between the ferromagnetic flux-conducting components (07) corresponding to the width of one magnetic pole (05) of the pole wheel (02).

17 Claims, 1 Drawing Sheet

(51) Int. Cl.
*G01D 5/14* (2006.01)
*G01D 5/245* (2006.01)

(56) References Cited

U.S. PATENT DOCUMENTS

| | | | |
|---|---|---|---|
| 5,663,641 A * | 9/1997 | Morita | G01P 3/487 |
| | | | 324/174 |
| 6,593,734 B1 | 7/2003 | Gandel et al. | |
| 6,998,838 B2 * | 2/2006 | Lin | G01D 5/145 |
| | | | 324/207.2 |
| 7,096,593 B2 | 8/2006 | Schmied | |
| 7,170,280 B2 * | 1/2007 | Lohberg | G01P 3/489 |
| | | | 324/207.24 |
| 7,463,023 B1 * | 12/2008 | Moreno | G01D 5/145 |
| | | | 324/207.2 |
| 9,091,702 B2 | 7/2015 | Ausserlechner | |
| 2005/0007105 A1 * | 1/2005 | Siegle | G01P 3/487 |
| | | | 324/207.25 |
| 2008/0180090 A1 * | 7/2008 | Stolfus | G01D 5/145 |
| | | | 324/174 |
| 2008/0258715 A1 * | 10/2008 | Reichert | G01L 5/221 |
| | | | 324/207.13 |
| 2009/0278530 A1 * | 11/2009 | Welsch | G01D 5/145 |
| | | | 324/207.2 |
| 2010/0176799 A1 * | 7/2010 | Ausserlechner | G01B 7/30 |
| | | | 324/207.2 |
| 2011/0101969 A1 | 5/2011 | Gualtieri | |
| 2011/0126639 A1 * | 6/2011 | Behrens | G01L 3/104 |
| | | | 73/862.193 |
| 2012/0049519 A1 * | 3/2012 | Lange | H02K 1/2786 |
| | | | 290/44 |

FOREIGN PATENT DOCUMENTS

| | | |
|---|---|---|
| DE | 10 2004 010 948 | 10/2005 |
| DE | 102005010921 | 2/2006 |
| DE | 102006007926 | 8/2007 |
| DE | 60032582 | 10/2007 |
| DE | 102007018238 | 10/2008 |
| DE | 102007041798 | 3/2009 |
| DE | 102007060241 | 6/2009 |
| DE | 102009030020 | 1/2014 |
| WO | WO 2012/038169 | 3/2012 |

* cited by examiner

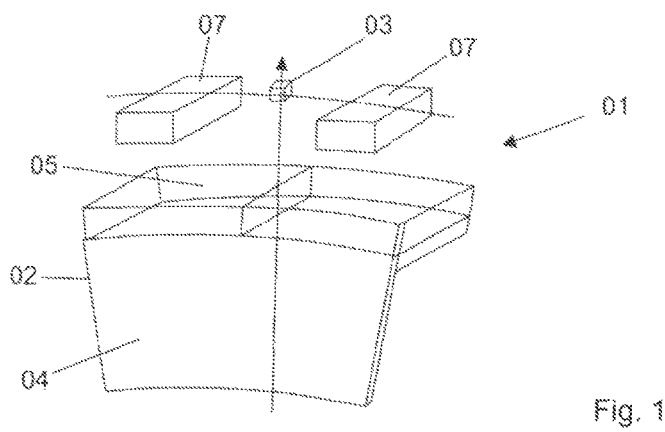
Fig. 1
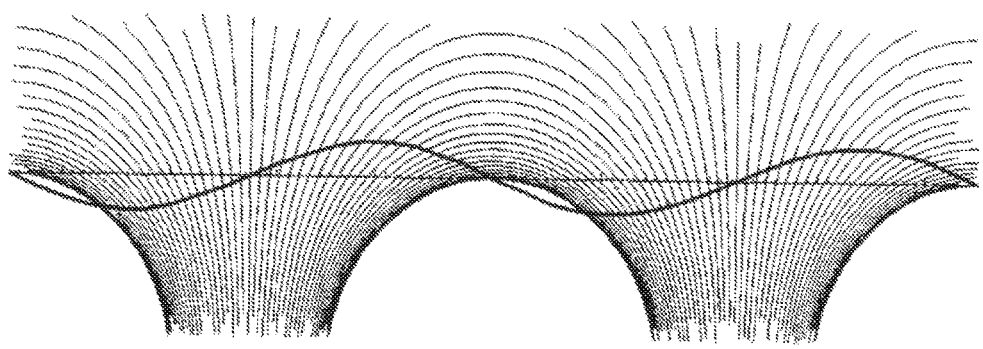
- prior art -    Fig. 2
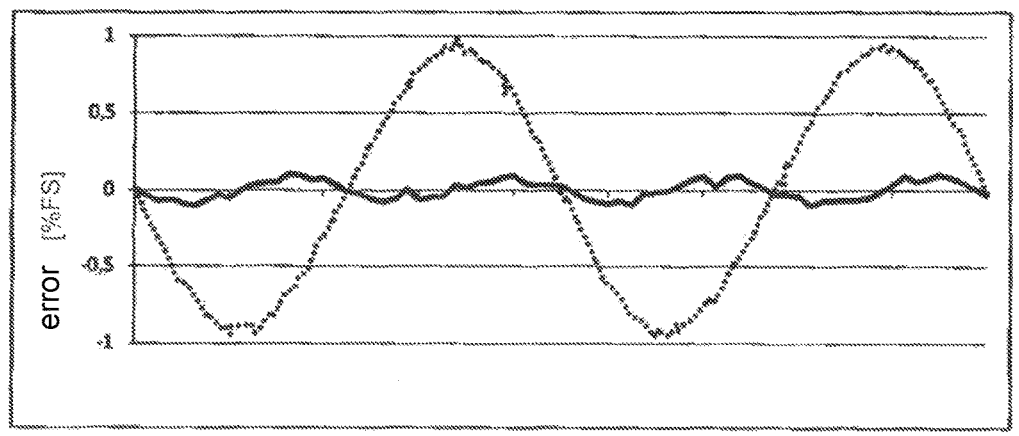
Fig. 3

SENSOR SYSTEM FOR ROTATIONAL SPEED MEASUREMENT HAVING A POLE WHEEL WITH A LINEARIZED MAGNETIC FIELD

The present invention relates to a sensor system for measuring the rotational speed of a rotatable component having a pole wheel, which includes a carrier with at least one path of alternating magnetic north and south poles, and having at least one magnetic field sensor for sampling the path of the pole wheel.

BACKGROUND

Pole wheels may be used as speed sensors or angle sensors. One typical field of application is electric drives for vehicles. Thus, pole wheels are used in angle and commutation sensors to generate signals as a function of the rotational motion of a component. Pole wheels are frequently used, for example, as signal encoders for ABS and speed sensors. Pole wheels include a disk-shaped or annular carrier, which has at least one path of magnetic north and south poles. The magnet poles are used as an etalon and may be sampled contactlessly with the aid of magnetic field sensors.

WO 2012/038169 A1 shows a sensor system for measuring the rotational speed of a rotatable machine element, in particular a wheel hub, including a signal encoder and a first and a second sensor. The signal encoder is coupled to the rotatable machine element and is situated concentrically with respect to its rotation axis and has information areas of two different types which alternate in the circumferential direction. The first sensor interacts with one information area and the second sensor interacts with a boundary area between two adjacent information areas. An information area of the first type is preferably designed as a magnetic plus pole, and an information area of the second type is designed as a magnetic minus pole.

An angle measuring device for a crankshaft of an internal combustion engine is known from DE 10 2004 010 948 B4. The angle measuring device includes a supporting body having a first magnetic path designed as a circular ring area and a second path designed as a cylindrical lateral area. Each path may be sampled by at least one electromagnetic sensor.

DE 102 10 372 A1 describes a rotation angle sensor, which includes a disk-shaped carrier of a first path of magnetic north and south poles and a second path of magnetic north and south poles with a number of north and south poles which deviate from the first path, and each including a sensor element for detecting the first and second paths. After startup of the rotation angle sensor, a first rough detection of the rotation angle of the path carrier is carried out with the aid of the first path, and a high resolution detection of the rotation angle is implemented with the aid of the second path. The sinusoidal signal of the rotation angle sensor is linearized by applying an angle function.

The pole wheels used in the prior art naturally have nonlinear characteristics of their field profiles with respect to the pole wheel position. If only the angular position of the pole wheel needs to be detected with an accuracy which corresponds approximately to the distance between adjacent poles, the pulses generated by the poles at the sensor may be evaluated. In particular, if the position between two adjacent poles is to be determined more precisely, the evaluation of the nonlinear characteristics presents considerable difficulties. To obtain a desired magnitude of linear signal characteristic in many applications, it is known to subsequently linearize the signal detected by the sensor on a microcontroller or in a control unit with the aid of suitable software algorithms. A problematic aspect of this procedure is that the computational linearization of a sensor signal generally covers a sensitivity which is unevenly distributed over the measuring range. A signal which is already originally linear is much more robust and responds to tolerance fluctuations in the same manner over the entire measuring range. It is furthermore disadvantageous that the microcontroller and the software algorithms used for the linearization incur costs. The nonlinearity of the signal must also be known in order to be able to apply a suitable linearization algorithm thereto.

It is furthermore known to use pole wheels which are specifically adapted to the particular application. However, this has the great disadvantage that special pole wheels are much more expensive to manufacture than are more basic components. In addition, standard ABS encoders, in particular, are so widespread that they may be mass produced and may thus be very easily acquired.

SUMMARY OF THE INVENTION

It is an object of the present invention to provide a sensor system for measuring rotational speed, which includes a pole wheel whose magnetic field provides a preferably linear field angle change for each pole wheel rotation to a sensor which evaluates the field direction or strength. Moreover, the sensor system should be able to revert to cost-effective standard components.

The present invention provides a ferromagnetic flux conducting element is situated upstream and downstream from the magnetic field sensor, opposite the path, in the rotational direction, the ferromagnetic flux conducting elements being situated at least partially in the installation space between the magnetic field sensor and the pole wheel, viewed in the radial direction. The distance between the ferromagnetic flux conducting elements in the rotational direction corresponds approximately to the length of a magnetic pole of the pole wheel.

One essential advantage of the sensor system according to the present invention is apparent in that, by using ferromagnetic flux conducting elements, the course of the magnetic flux density may be changed in such a way that its angle change more uniformly accompanies the rotor rotation. An optimization of the profile of the vector field is achieved in such a way that an approximately linear correlation between the field angle change and the pole wheel angle change occurs at a suitable sensor position. The magnetic field sensor used to sample the path of the pole wheel thus delivers an approximately linear sensor signal which is much more robust and reacts uniformly to tolerance fluctuations in the entire measuring range. Since, according to the present invention, a largely linear signal already exists, due to the implemented influence of the magnetic flux at the sensor, the complex, computational linearization of the sensor signal previously required is no longer necessary, which is very advantageous, not least for cost reasons. Another advantage is apparent in that no changes are necessary at the pole wheel itself, whereby relatively economical mass-produced pole wheels may be utilized.

The air gap between the magnetic field sensor and the pole wheel is larger than the air gap between the ferromagnetic flux conducting elements and the pole wheel. This arises from the arrangement of the flux conducting elements in the installation space between the magnetic field sensor and the pole wheel.

According to one preferred specific embodiment, the flux conducting elements have a rod-shaped design. The length of the flux conducting elements preferably corresponds to the path width of a magnetic pole. The flux conducting elements preferably have a width that is <50% of the length of a magnetic pole.

The pole wheel may be designed as a radial pole wheel. In radial pole wheels, the path of the magnetic north and south poles is designed as a cylindrical lateral area. The path has a radial effective direction and may be sampled radially with the aid of a magnetic field sensor.

In alternative specific embodiments, the pole wheel may be designed as an axial pole wheel. Axial pole wheels have a path of magnetic north and south poles which is designed as a cylindrical lateral area. The path has an axial effective direction and may be sampled axially with the aid of a magnetic field sensor.

Specific embodiments are also possible, in which the pole wheel has more than one path of magnetic north and south poles. Multiple paths having a radial or axial effective direction may also be provided. A combination of paths having radial and axial effective directions is also possible. In these embodiments, ferromagnetic flux conducting elements are to be situated accordingly opposite each path of magnetic north and south poles.

It has proven to be advantageous if all poles each have an identical pole angle.

BRIEF DESCRIPTION OF THE DRAWINGS

Preferred specific embodiments of the present invention are explained in greater detail below on the basis of the figures.

FIG. 1: shows a perspective view of a sensor system according to the present invention for measuring rotational speed;

FIG. 2: shows a representation of the curve of the magnetic field lines above a pole pair of a magnetic pole ring and the linearity error of a sensor system according to the prior art;

FIG. 3: shows a diagram for representing the linearity error of the sensor system according to the present invention and a sensor system according to the prior art.

DETAILED DESCRIPTION

FIG. 1 shows a perspective, simplified view of a sensor system according to the present invention for measuring rotational speed. Sensor system 01 according to the present invention includes a pole wheel 02 and a magnetic field sensor 03. Pole wheel 02 includes a disk-shaped carrier 04, which has a path, designed as a cylindrical lateral area, of alternating magnetic north and south poles 05. A pole wheel 02 having magnetic north and south poles 05 situated in this way is referred to as a radial pole wheel, since the magnetic material is applied radially to carrier 04 and thus has a radial effective direction.

Sensor system 01 according to the present invention furthermore includes two ferromagnetic flux conducting elements 07, which are situated upstream and downstream from magnetic field sensor 03 in the rotational direction and in the installation space between magnetic field sensor 03 and pole wheel 02 in the radial direction. The distance between ferromagnetic flux conducting elements 07 corresponds approximately to the width of a magnetic pole 05 of pole wheel 02. The air gap between magnetic field sensor 03 and pole wheel 02 is larger than the air gap between ferromagnetic flux conducting elements 07 and pole wheel 02.

Flux conducting elements 07 have a rod-like shape in the illustrated embodiment. To optimally influence the magnetic field of pole wheel 02, the length of flux conducting elements 07 corresponds to the path width of a magnetic pole 05, while the width of flux conducting elements is <50% of the length of a magnetic pole 05. All poles 05 of pole wheel 02 each preferably have the same pole angle.

In alternative specific embodiments, the path of magnetic north and south poles 05 may be designed as a circular ring area. Pole wheels of this type are referred to as axial pole wheels. In axial pole wheels, the magnetic material is applied axially to carrier 04 and thus has an axial effective direction. Magnetic field sensor 03, in turn, is correspondingly positioned, i.e., in this case it is oriented axially to pole wheel 02 to permit axial sampling.

The differences between the sensor signal obtained according to the present invention and the sensor signal obtained according to the prior art are explained in greater detail below on the basis of FIGS. 2 and 3.

FIG. 2 shows a representation of the curve of the magnetic field lines above a pole pair of a magnetic pole ring and the linearity error of a sensor system according to the prior art. Two items of information are superimposed in FIG. 2: A representation of the curve of the magnetic field lines above a pole pair of a pole wheel 02 forms the background. A linearity error of a sensor signal is plotted in the foreground, which uses the field angle as a measure of the pole pair position, i.e., the difference between the field angle and the ideal straight line over the length of the pole pair. In particular, it is apparent from FIG. 2 that the linearity error always becomes zero when the field line orientation to be measured runs perpendicularly or horizontally through the sensor. Conversely, the error always reaches its maximum when the field runs obliquely through the sensor at a 45° angle. As a result, the magnetic field should remain untouched in the orthogonal cases. This is achieved by the present invention.

FIG. 3 shows a diagram for representing the linearity error of the sensor system according to the present invention and of a sensor system according to the prior art. The ideal case is assumed, in which a straight output line from −TT to +TT is output via a pole pair. FIG. 3 illustrates the difference between the simulated sensor output signal and this ideal, with respect to the total value range. The dotted curve shows the linearity error of a sensor system according to the prior art. The solid curve shows the linearity error of the sensor system according to the present invention. By using ferromagnetic flux conducting elements 07, the distribution of the magnetic flux density is changed in such a way that its angle change accompanies the rotor rotation much more uniformly. This is achieved by the fact that, in the cases in which magnetic field sensor 03 is subjected to oblique field profiles, flux conducting elements 07 are variably magnetized. As a result, the field is distorted at the sensor position. This distortion largely counteracts the original linearity error, so that a significant improvement of the linearity error results. The orthogonal cases, however, are not influenced, since the magnetic flux here runs symmetrically through flux conducting elements 07. In this case, the angle of the field profile at the sensor position is not changed by the flux conducting elements 07, which are also situated mirror-symmetrically.

According to the present invention, the magnetic field of pole wheel 02 is optimized by the use of ferromagnetic flux conducting elements 07 in such a way that it provides magnetic field sensor 03 with an approximately linear field angle change for each pole wheel rotation. The subsequent, computational linearization of the sensor signal, which was previously required, may thus be dispensed with.

LIST OF REFERENCE NUMERALS

01—sensor system for measuring rotational speed
02—pole wheel
03—magnetic field sensor
04—carrier
05—pole
06—
07—ferromagnetic flux conducting elements

The invention claimed is:

1. A sensor system for measuring the rotational speed of a rotatable component, having a pole wheel, the sensor system including:
   a carrier with at least one path of alternating magnetic north and south poles;
   at least one magnetic field sensor for sampling the path on the carrier of the pole wheel;
   ferromagnetic flux conductors situated upstream and downstream from the magnetic field sensor, opposite the path, in a rotational direction, the ferromagnetic flux conductors being situated at least partially in an installation space between the magnetic field sensor and the carrier, viewed in a radial direction, and a distance between the ferromagnetic flux conductors corresponding to a length of one of the magnetic poles in the rotational direction, the pole wheel having at least one path with a radial effective direction and at least one further path with an axial effective direction, the magnetic field sensor being circumferentially between the ferromagnetic flux conductors such that the ferromagnetic flux conductors are mirror-symmetrically circumferentially spaced at distances from the magnetic field sensor.

2. The sensor system as recited in claim 1 wherein an air gap between the magnetic field sensor and the pole wheel is larger than the air gap between the ferromagnetic flux conducting elements and the pole wheel.

3. The sensor system as recited in claim 1 wherein the flux conductors are rod-shaped.

4. The sensor system as recited in claim 1 wherein a length of the flux conductors corresponds to a path width of one of the magnetic poles.

5. The sensor system as recited in claim 1 wherein the flux conductors have a width of <50% of the length of one of the magnetic poles.

6. The sensor system as recited in claim 1 wherein the path of the pole wheel is designed as a cylindrical lateral area.

7. The sensor system as recited in claim 1 wherein the path of the pole wheel is designed as a circular ring area.

8. The sensor system as recited in claim 1 wherein all of the magnetic poles of the pole wheel each have an identical pole angle.

9. A sensor system for measuring the rotational speed of a rotatable component, having a pole wheel, the sensor system including:
   a carrier with at least one path of alternating magnetic north and south poles;
   at least one magnetic field sensor for sampling the path on the carrier of the pole wheel;
   ferromagnetic flux conductors situated upstream and downstream from the magnetic field sensor, opposite the path, in a rotational direction, the ferromagnetic flux conductors being situated at least partially in an installation space between the magnetic field sensor and the carrier, viewed in a radial direction, and a distance between the ferromagnetic flux conductors corresponding to a length of one of the magnetic poles in the rotational direction,
   the magnetic field sensor providing a linear sensor signal upon sampling the at least one path, the magnetic field sensor and ferromagnetic flux conductors being arranged such that the magnetic field sensor is subjected to oblique field profiles and the flux conducting elements are variably magnetized so a magnetic field being sensed by the magnetic field sensor is distorted at a position of the magnetic field sensor and magnetic flux runs symmetrically through the flux conducting elements.

10. The sensor system as recited in claim 9 wherein an air gap between the magnetic field sensor and the pole wheel is larger than the air gap between the ferromagnetic flux conducting elements and the pole wheel.

11. The sensor system as recited in claim 9 wherein the flux conductors are rod-shaped.

12. The sensor system as recited in claim 9 wherein a length of the flux conductors corresponds to a path width of one of the magnetic poles.

13. The sensor system as recited in claim 9 wherein the flux conductors have a width of <50% of the length of one of the magnetic poles.

14. The sensor system as recited in claim 9 wherein the path of the pole wheel is designed as a cylindrical lateral area.

15. The sensor system as recited in claim 9 wherein the path of the pole wheel is designed as a circular ring area.

16. The sensor system as recited in claim 9 wherein the pole wheel has more than one path.

17. The sensor system as recited in claim 9 wherein all of the magnetic poles of the pole wheel each have an identical pole angle.

* * * * *